United States Patent [19]

Schulde et al.

[11] 4,007,299

[45] Feb. 8, 1977

[54] METHOD FOR MAKING MATT FINISH COATINGS

[75] Inventors: Felix Schülde, Wulfen; Johann Obendorf, Dorsten; Kurt Neubold, Gladbeck; Gunter Dörmann, Bochum, all of Germany

[73] Assignee: Veba-Chemie AG, Gelsenkirchen-Buer, Germany

[22] Filed: Aug. 21, 1975

[21] Appl. No.: 606,623

Related U.S. Application Data

[62] Division of Ser. No. 470,232, May 15, 1974, Pat. No. 3,947,384.

[52] U.S. Cl. .................. 427/195; 260/47 EN; 260/836; 427/201
[51] Int. Cl.$^2$ ............... B05D 3/02; B05D 3/10
[58] Field of Search ........... 427/195, 201; 260/836, 260/47 EN

[56] References Cited

UNITED STATES PATENTS

| | | | |
|---|---|---|---|
| 3,324,198 | 6/1967 | Gruver | 260/836 |
| 3,549,592 | 12/1970 | Godfrey et al. | 260/47 |
| 3,746,686 | 7/1973 | Marshall et al. | 260/47 EN |
| 3,842,035 | 10/1974 | Klarch | 260/47 EN |

*Primary Examiner*—Harry J. Gwinnell
*Assistant Examiner*—Shrive P. Beck
*Attorney, Agent, or Firm*—Burgess, Dinklage & Sprung

[57] ABSTRACT

Coatings having a matt finish are made by applying a powder varnish composition to a substrate and thereafter reacting the varnish at a temperature of 100° to 240° C to form the matt finish coating. The powder varnish composition is a finely divided, particulate mixture of i. a 1,2-epoxy compound having a melting point greater than 40° C and containing at least one 1,2-epoxy group; and ii. a salt of a polycarboxylic acid (such as pyromellite acid) containing three or more carboxyl groups and a cyclic amidine (such as 2-phenylimidazoline).

7 Claims, No Drawings

METHOD FOR MAKING MATT FINISH COATINGS

This is a division, of application Ser. No. 470,232, filed May 15, 1974 now U.S. Pat. No. 3,947,384.

BACKGROUND

This invention relates to a method for making matt finish coatings which can be classified on the Boller gloss scale as type 258, which 20 to 50%, (i.e. from matt to half-matt/half-gloss) on the basis of powder varnishes of 1,2-epoxy compounds and salts of polybasic carboxylic acids and cyclic amidines and conventional additives such as leveling agents.

Powder varnishes are being used increasingly for making coatings. Powder varnishes are finely powdered synthetic compositions containing a thermosetting compound, mostly a resin, a cross-linking agent, i.e. hardener and additives such as pigments, dyes, fillers, leveling agents and so on.

Among the thermosetting powder varnish systems, coating powders based on epoxy resins are used predominantly.

By using common hardeners like amines, acid anhydrides, boron trifluoride complexes, polyamino amides, dicyandiamide or substituted dicyandiamide, coatings with more or less high gloss finish are produced.

For special fields of application, for example smaller surfaces, glossy or half-glossy coatings are desired. Objects of large surfaces, however, are supplied with matt or half-matt finish coatings in order to avoid undesirable or unsuitable reflections of light.

In order to obtain a matt surface finish, matting agents like particulate (micro) silicic acid, talcum and so on must be worked into the composition. It is often a problem to work with materials having different densities which can lead to undesirable separation of the coating mass, to working difficulties and/or differences in coating quality.

SUMMARY

A method has been found for making matt finish coatings without additives (for example silicic acid or talcum) by using powder coatings comprising finely divided mixtures of i. 1,2-epoxy compounds having at least one 1,2-epoxy group in the molecule and a lower melting point greater than 40° C;

ii. an N-containing salts of polycarboxylic acid with three or more carboxyl groups; and iii. cyclic amidines having the formula appearing herein. The powder coatings are recited at 100° to 240° C., preferably 175° to 220° C to form the matt finish coatings.

DESCRIPTION

Suitable salts of polybasic carboxylic acids with three or more carboxyl groups are, for example trimellite acid, pyromellite acid, butane tetracarbonate acid, cyclopentane-tetracarboxylic acid and the like.

Cyclic amidines have the formula

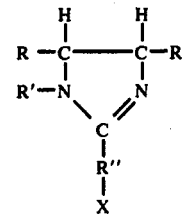

wherein R represents hydrogen or an alkyl- or aryl radical,

R' is the same as R or represents a cycloalkyl, heterocycloalkyl radical

R" an alkyl- or aryl substituted alkylene or arylene radical and

X represents hydrogen or the radical

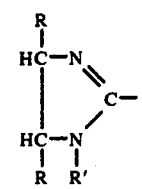

wherein
R and R' are as defined above.

Preferred alkylene and alkyl radicals contain from 1 to 12 preferably 1 to 8 carbon atoms. Preferred cycloalkyl radicals contain 4 to 12 carbon atoms, preferably 6 to 8 carbon atoms. Preferred heterocycloalkyl are the same as cycloalkyl and additionally containing one or more —N—, —S—, and/or —O— atoms in the ring. Preferred aryl and arylene radicals contain 6 to 12 aromatic carbon atoms, such as phenyl and naphthyl. Preferred substituents for alkylene and arylene radicals are alkyl with 1 to 8, preferably 1 to 4 carbon atoms and aryl with 6 to 12 aromatic carbon atoms, e.g., phenyl and naphthyl.

Suitable cyclic amidines are imidazolines such as 2-methylimidazoline, 2,4-dimethylimidazoline, 2-ethylimidazoline, 2-ethyl-4-methylimidazoline, 2-benzylimidazoline, 2-phenylimidazoline 2-(o-tolyl)-imidazoline, 2-(p-tolyl)-imidazoline, tetramethylene-bis-imidazoline, 1,1,3-trimethyl-1,4-tetramethylene-bis-imidazoline, 1,3,3-trimethyl-4-tretramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,4-phenylene-bis-imidazoline, 1,4-phenylene-bis-4-methylimidazoline and the like. Mixtures of the imidazoline derivatives may also be used in accordance with the invention.

The salts are made such that one or more of the carboxyl groups of the poly-carboxylic acids are neutralized with the single-basic or double-basic reacting imidazoline derivatives. It is preferred to suspend or dissolve the polycarboxylic acid in a polar aprotic solvent and then feed the imidazoline in the desired molar ratio by itself or dissolved or suspended in the same solvent under stirring at temperatures between room temperature (about 23° C) and 100° C. The reaction speed depends on the solvent and the reaction temperature.

Preferred solvents are dimethyl formamide, dimethyl acetamide and N-methyl pyrrolidone. In these solvents the reaction is completed at temperatures between 60° and 100° C in one hour. At room temperature, the salts formed are very hard to dissolve in these solvents and thus can be recovered by filtration in over 90% yields. To increase the yields, the mother liquor is recycled repeatedly. In addition, these solvents have the advantage that impure polycarboxylic acids can be used because impurities (especially of colored nature) are soluble in these solvents and they remain in the mother liquor, thereby isolating the pure salts. The mother liquor can be purified with activated charcoal.

Further lower aliphatic ketones are also suitable as solvents. These solvents have the advantage that the salts formed are very hard to dissolve and thus yields are nearly quantitative. There are also some drawbacks, however, which are as follow:

1. The reaction times to complete the salt formation are longer than with the preferred solvents. For example, at the boiling point, 8 hours are needed for making the disalt of the pyromellite acid with 2-phenylimidazoline in acetone and, at room temperature, 24 hours are needed.

2. Colored impurities from the polycarboxylic acids are dissolved, but not as well as with the preferred solvents.

3. The main drawback is that the polycarboxylic acids in ketones, show slight alkalinity as compared to the preferred weak basic solvents. For example, pyromellite acid reacts in acetone only double-basic; in trimellite acid only single-basic, while both acids react in dimethyl formamide four-basic and double basic.

Also, lower aliphatic alcohols can be used as solvents. The advantages and drawbacks for using alcohols are between the ketones and the preferred solvents.

For making the salts, cyclic amidines are used in such molar ratios that at least one mole of amidine is used for each mole polycarboxylic acid up to one mole of amidine for each mole of carboxyl group in the acid. Thus, the molar ratio of amidine to polycarboxylic acid can range from 1 : 1 to 4 : 1.

By using these salts as a hardener for powder varnish systems based on 1,2-epoxy compounds, coatings are obtained which are technologically as well as optically equivalent to the films and coatings produced with conventional hardeners and matting agents. The advantages realized, however, by eliminating the use of conventional additives are easier working masses with better homogeneity of the powder. The recovery and reuse of excess pulverous materials from the first coating with the composition in dry state mixed in specific weight different components, like hardeners, binders, $TiO_2$, leveling agents and matting agents are of great importance for the homogeneity and consistency. Here the conventional resin/hardener/pigment-system without addition of matting agents where a satisfactory and well-reproducable matting effect of the films occurs, shows a great advantage for the industrial practice. The matt films of the invention show great resistance to stresses, shock, bending and scratching.

Gloss rate is defined according to the method of Gardener in the Mehrwinkel-Glanzmesser. It corresponds to the appropriate testing specifications according to ASTM, U.S. Federal and TAPPI.

According to this measuring theory, 20° for highgloss measurings and 85° for matt-gloss is used. The angles 45°, 60° and 75° for the corresponding variations are between whereby the 60°-method is broad in its use. In 9 and 10 cases, where numerous glass values are given, this scale is taken.

The formerly described imidazoline salts are used in amounts of 2 to 15 wt.%, preferably 4 to 10 wt.%, with reference to epoxy resin.

Suitable for the preparation of the finely divided mixtures which are to be used as powder varnishes are 1,2-epoxy compounds having at least one 1,2 -epoxy group in the molecule and a lower melting point greater than 40° C, that is, compounds, which correspond to this characteristic, are on the one hand, polyepoxy compounds which are solid at 40° C and below, including higher-molecular compounds (so-called solid resins), and those which are solid as a result of their symmetrical structure or the size of the carbon systems bound to the 1,2-epoxy group, and on the other hand those which have been prepared by the reaction of liquid 1,2-epoxy compounds having more than one epoxy group per molecule with primary or secondary amines in such quantities that the adduct contains at least an average of one more 1,2-epoxy group per molecule (so-called adduct hardeners).

The 1,2-epoxy compounds may be either saturated or unsaturated and they may be aliphatic, cycloaliphatic, aromatic or heterocyclic. They may furthermore contain substituents which under the conditions of mixture or reaction do not cause any undesired side-reactions. Alkyl or aryl substituents, hydroxyl groups, either groupings and the like do not cause side-reactions.

Of the solid resins those preferred for this application are 1,2-epoxy compounds having more than one epoxy group in the molecule, whose epoxy equivalent weight is between 500 and 1000.

These are the solid, polymeric polyglycidyl polyethers of 2,2-bis-(4-hydroxyphenyl-propane which are obtained, for example, by the reaction of 2,2-bis-(4-hyroxyphenyl)-propane with epichlorhydrine in molar ratios 1 : 1.9 to 1 : 1.2 (in the presence of an alkali hydroxide in aqueous medium). Polymeric polyepoxides of this kind may also be obtained through the reaction of a polyglycidyl ether of 2,2-bis-(4-hydroxyphenyl)propane with less than the equimolecular amount of bivalent phenol, preferably in the presence of a catalyst such as a tertiary amine, a tertiary phosphine or a quaternary phosphonium salt. The polyepoxide may also be a solid epoxidized polyester which has been obtained for example, through the reaction of a polyvalent alcohol and/or a polybasic carboxylic acid or its anhydride with a low-molecular polyepoxide. Examples of such polyepoxides of low molecular weight are liquid diglycidyl ether of 2,2-bis-(4-hydroxyphenyl)propane, diglycidylphthalate, diglycidylhexahydrophthalate, diglycidylmaleate and the 3,4-epoxycyclohexylmethylester of 3,4-epoxy-cyclohexanecarboxylic acid.

Mixtures of solid polyepoxides may also be used, such as for example a mixture of a polyepoxide whose melting point is between 120° and 160° C and a polyepoxide having a melting point between 60° and 80° C (melting point set forth herein is determined by the mercury method of Durrans). Suitable mixtures contain between 30 and 50 wt.% of a solid polyglycidyl ether of 2,2-bis-(4-hydroxyphenyl)-propane with an epoxy equivalent weight between 1650 and 2050 and a melting point of 120° to 160° C and, between 50 and 70 wt.% of a solid polyglycidyl polyether of 2,2-bis-(4-hydroxyphenyl)-propane with an epoxy equivalent weight between 450 and 525 and a melting point of 60° to 80° C.

If a high epoxy functionality appears desirable, a preferred polyepoxide is the polyglycidyl ether of 1,1,2,2-tetra-(hydrophenyl)-ethane.

Also epoxidized polybutadiene can be applied for this purpose.

As previously mentioned, adduct hardeners can also be used in addition to the so-called solid resins, for the practice of the method of the invention. Such solid adduct hardeners may be prepared, for example from liquid polyepoxides of polyunsaturated hydrocarbons such as vinyl cyclohexane, dicyclopentadiene, and the like, epoxy ethers of polyvalent alcohols and phenols, and aliphatic, cycloaliphatic and aromatic diamines. For such an adduct to be suitable, its lower melting point must be above 40° C.

To improve the leveling characteristics of the varnishes, so-called leveling agents are added to them during their preparation. These agents may be chemical compounds or mixtures of chemical compounds of widely varying chemical types, such as polymeric or monomeric compounds, acetals such as polyvinylformal polyvinylacetal, diethyl-2-ethylhexanolacetal, di-n-butyl-2-ethylhexanolacetal, di-i-butyl-2-ethylhexanolacetal, di-2-ethylhexylacetaldehyde-acetal, and the like, ethers, such as the polymeric, polyethyleneglycols and polypropyleneglycols, copolymers of n-butylacrylate and vinylisobutylether, ketone-aldehyde condensation resins, solid silicone resins or mixtures of zinc soaps, of fatty acids and aromatic carboxylic acids and the like. Products such as Modaflow are also offered commercially for this purpose. The exact chemical character of Modaflow is unknown but it can be described as a complex, polymeric, effective liquid. Such leveling agents may be contained in the batches in amounts of 0.2 to 5.0% of the weight of the entire powder varnish.

The other components of the powder varnish mixture, such as pigments, dyes and fillers, may be present in a wide range of proportions with respect to the 1,2-epoxy compounds.

After the powder varnish is applied to the substrate or object to be coated, the latter is heated at temperatures of 160° to 240° C, preferably 175° and 220° C, to set them. Thereafter the coating will have the above-described advantages.

Prior to use, the powder varnish components are intimately mixed at temperatures below the hardening temperatures, extruded and then crushed into a particulate mass. For practical application a particle size of less than 100 microns is preferable. The maximum particle size should be between 30 and 50 microns.

The application of the powder varnish to the substrates or bodies to be coated is accomplished by known method, e.g., by electrostatic powdering, fluidized-bed sintering or electrostatic fluidized-bed sintering.

The invention will now be further described with reference to the following examples which are not intended to be otherwise limiting.

GENERAL DESCRIPTION OF THE METHOD APPLIED

The 1,2-epoxy compounds with the characteristics described above, known in practice as epoxy resins, were mixed with the imidazoline salts serving both as accelerator and hardener, with the pigments and with the additives such as leveling agents, in the stated ratios by weight, and then extruded and crushed. The particle size of the powder varnish components was less than 100 microns. The frequency distribution of the particle size had its maximum in the range from 30 to 50 microns. The finely granular mixtures for the different technological tests were then applied to steel sheets (70 × 150 × 0.75 mm and 70 × 200 × 1 mm) by electrostatic dusting and then set at the stated temperatures for the stated lengths of time. The characteristics of the varnish films obtained were subjected to the tests listed set out hereinafter.

EXAMPLE 1

The monosalt of trimellite acid and 2-phenylimidazoline was made into a powder varnish or sintering powder with titanium dioxide and an epoxy resin plus a small amount of leveling agent in the following proportions:

Composition of the Powder Varnish

| Composition of the Powder Varnish | |
|---|---|
| Solid epoxy resin on the basis of an adduct of 2,2-bis-(4-hydroxyphenyl)-propane (diane) and epichlorhydrin, which had been subjected to an HCl cleavage and had then been reacted with the additional diane and which according to the manufacture had an epoxy equivalent weight ranging between 900 and 1000, which corresponds to an epoxy value of 0.10 to 0.11 and has a melting range of 90 to 100° C | 54.5 wt.% |
| Monosalt of trimellite acid and 2-phenyl-imidazoline | 5.0 wt.% |
| TiO$_2$ in powder form | 40.0 wt.% |
| "Modaflow" leveling agent | 0.5 wt.% |

This formulation was applied to the test sheets and after 10 minutes setting at 200° C it was tested.

| Coating thickness | | 60 – 70 microns |
|---|---|---|
| Gloss | (Gardener, 60°) | 33% |
| Erichsen cupping | (DIN 53 156) | 8 – 9 mm |
| Cross cut adhesion test | (DIN 53 151) | Gt 0 |
| Mandrel bending test | (DIN 53 152) | 2 mm |
| Buchholz hardness | (DIN 53 153) | 111 |
| Ball impact test (reverse impact) | (Gardener) | 80 in lb |

EXAMPLE 2

The disalt of trimellite acid and 2-phenylimidazoline was formulated with epoxy resin of Example 1.

| Composition of the Powder Varnish | |
|---|---|
| Epoxy resin | 55.5 wt.% |
| Disalt of trimellite acid and 2-phenyl-imidazoline | 4.0 wt.% |
| TiO$_2$ in powder form | 40.0 wt.% |
| Leveling agent (as in Example 1) | 0.5 wt.% |

After 10 minutes of setting the test sheets at 200° C the following results were obtained by testing the coating:

| Coating thickness | | 60 – 70 microns |
|---|---|---|
| Gloss | (Gardener, 60°) | 30% |
| Erichsen cupping | (DIN 53 156) | 4 – 5 mm |
| Cross cut adhesion test | (DIN 53 151) | Gt 0 |
| Mandrel bending test | (DIN 53 152) | 4 |
| Buchholz hardness | (DIN 53 153) | 100 |

-continued

| | | |
|---|---|---|
| Ball impact test | (Gardener) | 20 – 30 in lb |

EXAMPLE 3

The disalt of butane tetracarboxylic acid and 2-phenylimidazoline was made into a powder varnish or sintering powder with titanium dioxide and an epoxy resin plus a small amount of leveling agent in the following proportions:

Composition of the Powder Varnish

| Composition of the Powder Varnish | |
|---|---|
| Solid epoxy resin on the basis of an adduct of 2,2-bis-(4-hydroxyphenyl)-propane (diane) and epichlorhydrine, which had been subjected to a HCl cleavage and which according to the manufacture had an epoxy equivalent weight ranging between 700 and 875 which corresponds to an epoxy value of 0.142 to 0.114 and a melting range of 85 to 100° C | 54.5 wt.% |
| Disalt of butane tetracarboxylic acid and 2-phenylimidazoline | 5.0 wt.% |
| $TiO_2$ in powder form | 40.0 wt.% |
| Leveling agent (as in Example 1) | 0.5 wt.% |

After 15 minutes of setting the pulverous coating of the test sheets at 180° C the following results were obtained:

| | | |
|---|---|---|
| Coating thickness | | 65 – 80 μ |
| Gloss | (Gardener, 60°) | 15% |
| Erichensen cupping | (DIN 53 156) | 5 – 6 mm |
| Cross-cut adhesion test | (DIN 53 151) | Gt 0 |
| Mandrel bending test | (DIN 53 152) | 3 – 4 |
| Buchholz hardness | (DIN 53 153) | 100 |
| Ball impact test | (Gardener) | 20 in lb |

EXAMPLE 4

Monosalt of pyromellite acid and 2-phenylimidazoline was made into a powder varnish or sintering powder with titanium dioxide and the epoxy resin of Example 1 plus a small amount of leveling agent in the following proportions:

| Composition of the Powder Varnish | |
|---|---|
| Epoxy resin | 54.5 wt.% |
| Monosalt of pyromellite acid and 2-phenylimidazoline | 5.0 wt.% |
| $TiO_2$ in powder form | 40.0 wt.% |
| Leveling agent (as in Example 1) | 0.5 wt.% |

This formulation was applied to the test sheets and after 10 minutes setting at 200° C the following results were obtained:

| | | |
|---|---|---|
| Coating thickness | | 70 – 80 microns |
| Gloss | (Gardener, 60°) | 5% |
| Erichsen cupping | (DIN 53 156) | 7.0 mm |
| Cross-cut adhesion test | (DIN 53 151) | Gt 0 |
| Mandrel bending test | (DIN 53 152) | 2 |
| Buchholz hardness | (DIN 53 153) | 144 |
| Ball impact test | (Gardener) | 80 in lb |

EXAMPLE 5

The disalt of pyromellite acid and 2-phenylimidazoline was made into a powder varnish or sintering powder with titanium dioxide and the epoxy resin of Example 1 plus a small amount of leveling agent in the following proportions:

| Composition of the Powder Varnish | |
|---|---|
| Epoxy resin | 56.0 wt.% |
| Disalt of pyromellite acid and 2-phenylimidazoline | 3.5 wt.% |
| $TiO_2$ in powder form | 40.0 wt.% |
| Leveling agent (as in Example 1) | 0.5 wt.% |

After 15 minutes of setting the powder coating on the test sheets at 180° C the following results were obtained:

| | | |
|---|---|---|
| Coating thickness | | 70 – 80 microns |
| Gloss | (Gardener, 60°) | 20% |
| Erichsen cupping | (DIN 53 156) | 9 – 10 mm |
| Cross-cut adhesion test | (DIN 53 151) | Gt 0 |
| Mandrel bending test | (DIN 53 152) | 2 |
| Buchholz hardness | (DIN 53 153) | 111 |
| Ball impact test | (Gardener) | 80 in lb |

EXAMPLE 6

The trisalt of pyromellite acid and 2-phenylimidazoline was made into a powder varnish or sintering powder with titanium dioxide and an epoxy resin plus a small amount of leveling agent in the following proportions:

Composition of the Powder Varnish

| Composition of the Powder Varnish | |
|---|---|
| 4 parts of a solid epoxy resin of Example 1 and 1 part of a solid epoxy resin according to the production of Example 1, however, according to the manufacture with an epoxy equivalent weight ranging between 450 and 500 which corresponds to an epoxy value of 0.200 to 0.225 and a melting range of 60 to 70° C | 54.5 wt.% |
| Trisalt of pyromellite acid and 2-phenylimidazoline | 5.0 wt.% |
| $TiO_2$ in powder form | 40.0 wt.% |
| Leveling agent (as in Example 1) | 0.5 wt.% |

This formulation was applied on test sheets and it was tested after 10 minutes of setting at 200° C with the following results:

| | | |
|---|---|---|
| Coating thickness | | 60 – 65 microns |
| Gloss | (Gardener, 60°) | 40% |
| Erichsen cupping | (DIN 53 156) | 8 – 9 mm |
| Cross-cut adhesion test | (DIN 53 151) | Gt 0 |
| Mandrel bending test | (DIN 53 152) | 2 |
| Buchholz hardness | (DIN 53 153) | 111 |
| Ball impact test | (Gardener) | 70 – 80 in lb |

EXAMPLE 7

Tetrasalt of pyromellite acid and 2-phenylimidazoline was made into a powder varnish or sintering powder with titanium dioxide and the epoxy resin of Example 1 plus a small amount of leveling agent in the following proportions:

| Composition of the Powder Varnish | |
|---|---|
| Epoxy resin | 56.5 wt.% |
| Tetrasalt of pyromellite acid and 2-phenylimidazoline | 3.0 wt.% |
| TiO$_2$ in powder form | 40.0 wt.% |
| Leveling agent (as in Example 1) | 0.5 wt.% |

After 10 minutes of setting the powder coating of the test sheets at 200° C the following results were obtained:

| Coating thickness | | 75 – 80 microns |
|---|---|---|
| Gloss | (Gardener, 60°) | 30% |
| Erichsen cupping | (DIN 53 156) | 9 – 10 mm |
| Cross-cut adhesion test | (DIN 53 151) | Gt 0 |
| Mandrel bending test | (DIN 53 152) | 2 |
| Buchholz hardness | (DIN 53 153) | 111 |
| Ball impact test | (Gardener) | 70 in lb |

EXAMPLE 8

The disalt of pyromellite acid and 2,4-dimethylimidazoline was made into a powder varnish or sintering powder with titanium dioxide and the epoxy resin of Example 1 plus a small amount of leveling agent in the following proportions:

| Composition of the Powder Varnish | |
|---|---|
| Epoxy resin | 54.5 wt.% |
| Disalt of pyromellite acid and 2,4-dimethylimidazoline | 5.0 wt.% |
| TiO$_2$ in powder form | 40.0 wt.% |
| Leveling agent (as in Example 1) | 0.5 wt.% |

After 10 minutes of setting the powder coating of the test sheets at 200° C the following results were obtained:

| Coating thickness | | 70 – 80 microns |
|---|---|---|
| Gloss | (Gardener, 60°) | 40% |
| Erichsen cupping | (DIN 53 156) | 8 – 9 mm |
| Cross-cut adhesion test | (DIN 53 151) | Gt 0 |
| Mandrel bending test | (DIN 53 152) | 2 |
| Buchholz hardness | (DIN 53 153) | 166 |
| Ball impact test | (Gardener) | 20 – 30 in lb |

EXAMPLE 9

The disalt of pyromellite acid and 2-(m-tolyl)-imidazoline was made into powder varnish and sintering powder with titanium dioxide and the epoxy resin of Example 1 plus a small amount of leveling agent in the following proportions:

| Composition of the Powder Varnish | |
|---|---|
| Epoxy resin | 55.5 wt.% |
| Disalt of pyromellite acid and 2-(m-tolyl)-imidazoline | 4.0 wt.% |
| TiO$_2$ in powder form | 40.0 wt.% |
| Leveling agent (as in Example 1) | 0.5 wt.% |

After 10 minutes of setting the powder coating on the test sheets at 200° C the following results were obtained:

| Coating thickness | | 65 – 75 microns |
|---|---|---|
| Gloss | (Gardener, 60°) | 40% |
| Erichsen cupping | (DIN 53 156) | 8 – 9 mm |
| Cross cut adhesion test | (DIN 53 151) | Gt 0 |
| Mandrel bending test | (DIN 53 152) | 2 |
| Buchholz hardness | (DIN 53 153) | 100 |
| Ball impact test | (Gardener) | 60 – 70 in lb |

EXAMPLE 10

The disalt of pyromellite acid and 2-benzylimidazoline was made into a powder varnish or sintering powder with titanium dioxide and the epoxy resin of Example 1 plus a small amount of leveling agent in the following proportions:

| Composition of the Powder Varnish | |
|---|---|
| Epoxy resin | 55.5 wt.% |
| Disalt of pyromellite acid and 2-benzylimidazoline | 4.0 wt.% |
| TiO$_2$ in powder form | 40.0 wt.% |
| Leveling agent (as in Example 1) | 0.5 wt.% |

This formulation was applied to the test sheets and after 10 minutes setting at 200° C it was tested with the following results:

| Coating thickness | | 60 – 70 microns |
|---|---|---|
| Gloss | (Gardener, 60°) | 40% |
| Erichsen cupping | (DIN 53 156) | 8.0 mm |
| Cross-cut adhesion test | (DIN 53 151) | Gt 0 |
| Mandrel bending test | (DIN 53 152) | 2 |
| Buchholz hardness | (DIN 53 153) | 111 |
| Ball impact test | (Gardener) | 80 in lb |

What is claimed is:

1. Method for making matt finish coatings which comprises
  a. applying a powder varnish to a substrate, said powder varnish comprising a finely divided mixture of
    i. a 1,2-epoxy compound having at least one 1,2-epoxy group in the molecule and a lower melting point greater than 40° C; and
    ii. a salt of a polycarboxylic acid having three or more carboxyl groups; and a cyclic amidine having the formula

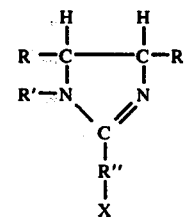

wherein
  R is H, alkyl or aryl;
  R' is the same as R and in addition cycloalkyl, or a heterocycloalkyl radical obtained by substituting one or more —N—, —S—, and/or —O— atoms in a cycloalkyl ring;
  R" is alkyl and aryl substituted alkylene or arylene; and
  X hydrogen or the radical

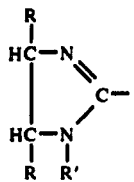

wherein

R and R" are as defined previously; and b. thereafter reacting said powder varnish at a temperature of 100° to 240° C to form a matt finish coating.

2. Method of claim 1 wherein said salt is present in amounts of 2 to 15 weight percent, based on the epoxy compound.

3. Method of claim 1 wherein the polycarboxylic acid and the cyclic amidine are in a molar ratio of 1 : 1 to 1 : 4.

4. Method of claim 1 wherein the polycarboxylic acid is selected from the group of trimellite acid, pyromellite acid, butane tetracarboxylic acid and cyclo-pentanetetracarboxylic acid.

5. Method of claim 1 wherein the cyclic amidine is 2-phenylimidazoline.

6. Method of claim 1 wherein the salt of pyromellite acid and 2-phenylimidazoline is used.

7. Method of claim 1 wherein the salt is the reaction product of 1 mole of pyromellite acid with 2 or 4 moles 2-phenylimidazoline used.

* * * * *

UNITED STATES PATENT AND TRADEMARK OFFICE
CERTIFICATE OF CORRECTION

PATENT NO. : 4,007,299
DATED : February 8, 1977
INVENTOR(S) : Felix Schülde et al It is certified that error appears in the above-identified patent and that said Letters Patent are hereby corrected as shown below:

Insert Item [30] Foreign Application Priority Data:
Date: May 16, 1973  Country: Germany  No: 2324696
Item [57] line 10, "pyromellite" should read --pyromellitic --.
Column 1, line 65, "trimellite" should read -- trimellitic --;
       line 66, "pyromellite" should read--pyromellitic--;
"tetracarbonate" should read -- tetracarbonic --.
Column 3, line 19, "pyromellite" should read -- pyromellitic --;
       line 28, "pyromellite" should read -- pyromellitic --;
       line 29, "double-basic" should read -- di-basic --;
delete "in" (second occurrence);
       line 30, "trimellite" should read -- trimellitic --;
"single" should read -- mono --.
       line 31, "four" should read -- tetra --; "double"
should read -- di --.
Column 4, line 29, "either" should read -- ether --.
Column 6, line 15, "trimellite" should read -- trimellitic --;
       line 24, delete "(diane)";
       line 27, delete "the"; delete "diane" and insert --
2,2-bis-(4-hydroxyphenyl)-propane --;
       line 30, "trimellite" should read -- trimellitic --;
       line 49, "trimellite" should read -- trimellitic --;
       line 54, "trimellite" should read -- trimellitic --.
Column 7, line 18, delete "(diane)";
       line 43, "pyromellite" should read -- pyromellitic --;
       line 52, "pyromellite" should read -- pyromellitic --.
Column 8, line 3, "pyromellite" should read -- pyromellitic --;
       line 11, "pyromellite" should read -- pyromellitic --;
       line 31, "pyromellite" should read -- pyromellitic --;
       line 44, "pyromellite" should read -- pyromellitic --;
       line 64, "pyromellite" should read -- pyromellitic --.

UNITED STATES PATENT AND TRADEMARK OFFICE
CERTIFICATE OF CORRECTION

PATENT NO. : 4,007,299
DATED : February 8, 1977
INVENTOR(S) : Felix Schülde et al It is certified that error appears in the above-identified patent and that said Letters Patent are hereby corrected as shown below:

Column 9, line 4, "pyromellite" should read -- pyromellitic --;
line 24, "pyromellite" should read -- pyromellitic --;
line 32, "pyromellite" should read -- pyromellitic --;
line 52, "pyromellite" should read -- pyromellitic --;
line 61, "pyromellite" should read -- pyromellitic --.
Column 10, line 12, "pyromellite" should read -- pyromellitic --;
line 21, "pyromellite" should read -- pyromellitic --.
Column 12, lines 8 - 9, "pyromellite" should read -- pyromellitic --;
line 13, "pyromellite" should read -- pyromellitic --;
line 16, "pyromellite" should read -- pyromellitic --.

Signed and Sealed this

Seventh Day of June 1977

[SEAL]

Attest:

RUTH C. MASON
*Attesting Officer*

C. MARSHALL DANN
*Commissioner of Patents and Trademarks*